July 24, 1956     R. S. VAN BENTHUYSEN     2,756,379
CONTROL FOR PROGRESSIVELY CHANGING CURRENT LOAD DEVICE
Filed Aug. 19, 1953
FIG.1.
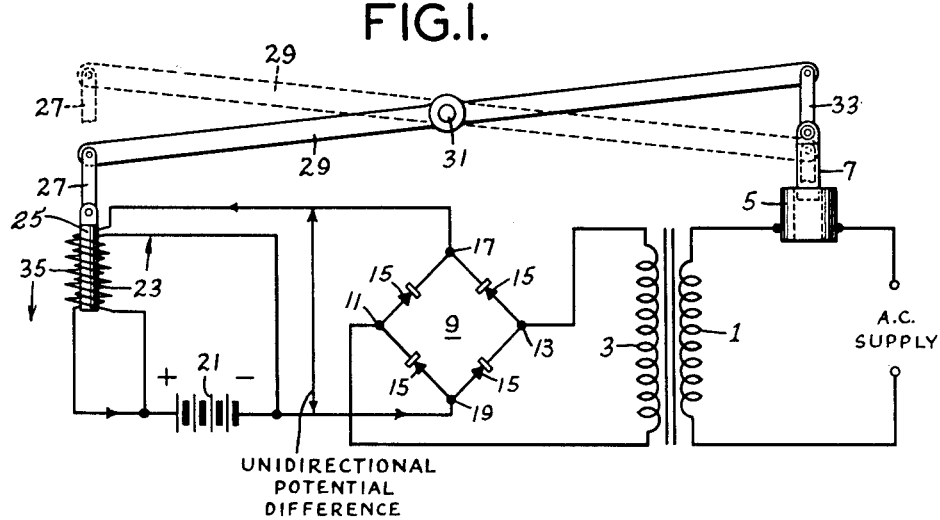
FIG.2.
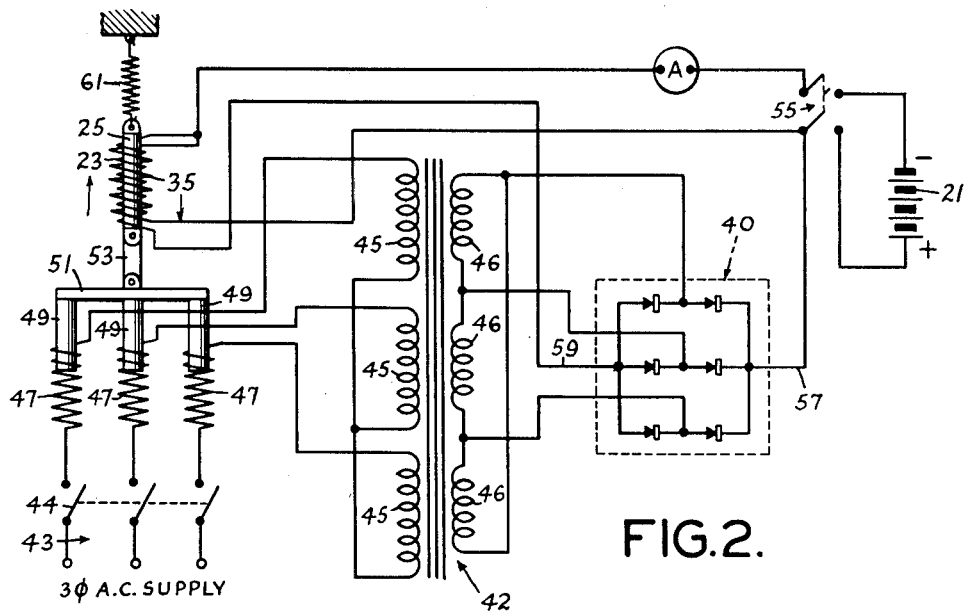
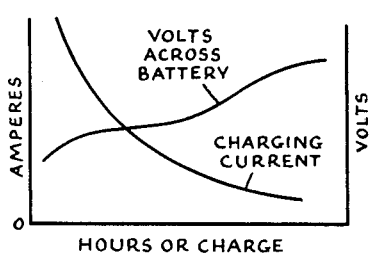
FIG.3.
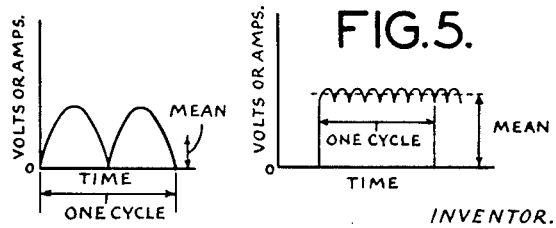
FIG.4.     FIG.5.
INVENTOR.
ROBERT S. VAN BENTHUYSEN
BY George W. Carey
HIS ATTORNEY.

United States Patent Office 2,756,379
Patented July 24, 1956

2,756,379

CONTROL FOR PROGRESSIVELY CHANGING CURRENT LOAD DEVICE

Robert Seaward Van Benthuysen, Millburn, N. J.

Application August 19, 1953, Serial No. 375,232

7 Claims. (Cl. 320—32)

This invention relates to an electrical control system for a load device carrying a unidirectional current of progressively changing amount. The invention more especially relates to an electrical control system for control of the charging current in charging storage batteries or the like. The invention finds particular application in the control of the unidirectional current delivered to a load device and supplied from a source of undulating potential difference, specifically a source of alternating current.

In controlling the operation of apparatus capable of delivering a unidirectional current to a load device, such as a storage battery or the like, in which a progressively changing current flows through the load device, it may be desirable to control the amount of this current so as not to exceed or not to be less than a predetermined amount of current flowing through the load device. In the charging of storage batteries, for example, it is necessary in order to prevent excessive formation of gas as the charge in the battery increases and to avoid excessive amounts of erosion from the plates of the battery, that the charging rate, that is, the amount of current delivered through the battery, be reduced substantially at a suitable point during the charging period. It has been proposed heretofore, for example, to change the charging rate so that the amount of current flowing through the battery is reduced in response to the increase to a predetermined potential of the potential of the battery which develops during the charging of the battery. Many of such systems and devices for control of the charging current involve relays and switches and the introduction of resistances or other means for reducing the amount of current flowing through the battery when the voltage of the battery has increased to a predetermined point suitably related to the point at which gassing starts or a substantial amount of gassing occurs. Since the deterioration of the plates is dependent also on the temperature of the battery, devices in the prior art have been proposed for control of the charging rate in response to the temperature of the electrolyte or of other part of the battery the temperature of which varies with the charging rate or with the degree of charge which has been delivered to the battery.

Such devices and systems of the prior art utilizing switches and relays and other devices as referred to above involve not only mechanical wear as well as erosion due to arcing upon opening and closing of the circuit but also are of less reliability and accuracy than is desirable because the controlling and controlled parts are not easily maintained in a reliably constant relation. Moreover, sticking of the armatures of the relays has given trouble and prevented precise operation and control.

It is an object of the invention to provide control apparatus for controlling a unidirectional current supplied to a load device of the type above referred to, such as a storage battery, with precision both as to the amount of current flowing at the time when the charging rate is to be changed and as to attending conditions of the load device.

It is another object of the invention to provide this precise control of the delivery of the unidirectional current to the load device or the battery without utilizing switches or other current breaking devices.

It is a further object of the invention to provide apparatus for controlling the delivery of unidirectional current to a load device or a battery from a supply of undulating potential difference which may be a source of periodically varying potential difference such as an alternating current supply.

It is a still further object of the invention to provide control apparatus which is responsive to an undulating unidirectional current in a circuit connected to a load device such as a storage battery, in which circuit the unidirectional current delivered through the circuit progressively changes.

It is an additional object of the invention to provide for control of the undulating or periodically varying current received from a supply of undulating or periodically varying potential difference, such as a supply of alternating current, by apparatus capable of delivering a unidirectional current to a load device or a battery. This control is effected in response to a progressively changing current flowing through the load device or battery and especially in response to an undulating unidirectional current flowing through the load device or battery produced and delivered from apparatus, such as a rectifier, connected to the source of undulating or periodically varying potential difference or the supply of alternating current.

Having regard to the above stated objects, it is an important feature of the invention that control means is connected in circuit with the load device or the battery which is responsive to progressive change of the unidirectional current flowing through the load device or the battery and that this means is operatively connected to control means connected in circuit with a source of undulating or periodically varying potential difference to which source also apparatus is connected which is adapted to deliver the unidirectional current flowing through the load device or battery. In a particular embodiment of the invention rectifying apparatus may be connected to a source of alternating current potential difference which supplies alternating current to the rectifying apparatus, this rectifying apparatus being connected to and being capable of supplying to the circuit in which the load device or the battery is connected a unidirectional current which, however, may be of undulating character as is the case with certain constructions of rectifying apparatus. With conventional rectifying apparatus this undulating unidirectional current may and usually does have a frequency of undulation which is a multiple of the frequency of the periodically varying or alternating current supply.

It is another feature of the invention that the means connected in the unidirectional circuit is sensitively responsive to the amount of the progressively changing current which may be the amount of the current as measured by the mean of the instantaneous values of the undulating unidirectional current flowing through the load device or battery. This control means in a specific embodiment may include a solenoid coil which is connected in series with the load device or the battery in a circuit connecting the load device in series with the supply of unidirectional potential difference.

The control means above mentioned which is connected to the source of undulating or periodically varying potential difference or to the alternating current supply may be connected in series with this supply in a circuit in which this control means is connected in series also with the apparatus, such as a rectifier, for delivering the unidirectional potential difference. In the preferred embodiment this control means connected to the undulating supply may be an inductance coil connected in series with the source, such as an alternating current supply, and in series with the alternating current terminals of a rectifier. It is a further important feature of the invention that means are provided for changing the inductance of the inductance coil at the proper time or under predetermined conditions so as to change the amount of undulating or periodically varying or alternating current delivered to the rectifying apparatus, thereby to control the amount of the unidirectional current delivered from this rectifying apparatus through the load device or battery circuit.

It is an additional feature of the invention that the operative connection between the control means in the unidirectional circuit and the control means in the circuit connected to the source of undulating potential difference provides for the change in the inductance in the undulating source circuit, specifically the alternating current circuit to the rectifying device, in response to a predetermined change in the unidirectional current flowing through the load device or the battery. In a practical embodiment in the charging of a storage battery the operative connection between the solenoid and the inductance coil is such that, when the unidirectional current flowing through the battery reaches a predetermined amount suitably related to the condition of gassing and the formation of deposits on the plates, the inductance of the inductance coil is abruptly changed.

In the preferred embodiment such change of the inductance in the circuit leading from a source of alternating current to a rectifier connected to a battery for charging the battery is accomplished by insertion of a core of magnetic material, such as soft iron, in an inductance coil and such insertion is effected by operatively connecting this core to a magnetic core provided for a solenoid coil which is connected in series in the battery circuit. This operative connection is so arranged that, when the charging current flowing through the battery reaches a predetermined amount, the core associated with the solenoid coil is moved in response to the change of the magnetic induction of this coil as determined by the amount of the current flowing through this coil. Upon such movement of the core of the solenoid the operative connection between the two cores effects the requisite movement of the core of the inductance coil into a position of greater magnetic induction so that the inductance of the alternating current circuit is increased and the amount of current delivered from the rectifier thereby is decreased. The operative connection is such also that reverse movement of the core of the solenoid coil will produce reverse movement of the core in the inductance coil and corresponding increase in the alternating current supplied to the rectifier.

It has been found, in the application of the above outlined features of the invention to practical charging of storage batteries or the like that, precise control of the amount of charging current and effecting the requisite change of this amount when the current reaches a predetermined amount, as well as the accomplishment of such change in a predetermined relation to the total charge which has been delivered to the battery, is made possible by determining the magnetic flux to which the core of the solenoid is subjected by the joint action of the current flowing through a current carrying coil of the solenoid which is connected in series with the battery and the current of a cooperating winding connected across a potential difference of the unidirectional circuit which varies with variation of the potential difference across the battery. The winding is so disposed relative to the solenoid coil that the lines of magnetic flux of the winding are generally coincident with the lines of magnetic flux of the solenoid coil. In the charging of a storage battery or the like this winding preferably is connected across the potential difference referred to of the unidirectional circuit so that the flux of the winding opposes the flux of the solenoid coil. Since the current flowing through the battery decreases due to the building up of the charge in the battery concomitantly with increase of the potential of the battery, connecting the winding across the battery itself secures increase of the magnetic flux of the winding with decrease of the magnetic flux of the current coil. As will be understood from the description in connection with the drawing, the point at which these two opposing fluxes are balanced with each other occurs at precise points in the respective curves of charging current and of battery potential. The movement of the core of the inductance coil, therefore, into the position of greater magnetic induction may be effected precisely in response to a current of predetermined amount which is flowing through the battery and at such a point in the charge period that the damaging effects of gassing and deposits are avoided or suitably limited.

Other objects and features of the invention will be understood from the following description taken in connection with the drawing in which:

Fig. 1 shows the control system of the invention in connection with a simple electric circuit.

Fig. 2 shows a modification of the control system of the invention in connection with a rectifier supplied from a three phase alternating current supply.

Fig. 3 shows the characteristic curves of the charging current and of the volts across a lead-acid storage battery.

Fig. 4 shows a characteristic curve of the unidirectional potential or the unidirectional current delivered by a rectifier supplied by a periodic alternating current single phase supply.

Fig. 5 shows a characteristic curve of the unidirectional potential or the unidirectional current delivered by a rectifier supplied by a periodic alternating current three phase supply.

In the embodiment of Fig. 1 the primary winding 1 of a transformer having secondary winding 3 is connected to a single phase alternating current supply in series with an inductance coil 5 having a magnetic core 7 for example of laminated soft iron, movable into and out of the cylindrical hollow space of the inductance coil, that is to say to positions of greater and less magnetic induction of the inductance coil 5. Such movement of the core 7, as hereinafter described, is effected in response to variation of the current supplied to a load device, such as a storage battery, thereby respectively to decrease and increase the current supplied to the primary 1 of the transformer upon movement of the core 7 into and out of the position of greater magnetic induction. Such decrease and increase of the current flowing through the primary winding 1 in accordance with well known principles results from the change produced in the inductance of the alternating current or other undulating or periodically varying current circuit by the increase and decrease of the lines of magnetic force in the iron core respectively in the positions within and out of the coil 5.

In the embodiment of Fig. 1 the secondary winding 3 of the transformer is connected in a conventional manner to a bridge type rectifier 9, the terminals of the winding 3 being connected to opposite terminals 11, 13 of the bridge 9 in the legs of which unidirectional current flow elements or rectifying valves 15 are disposed in the conventional manner to provide for flow of current from the winding 3 through the rectifier 9 and into the circuit connected to the terminals 17, 19 of the rectifier in one direction only as shown by the arrows in Fig. 1. As is well understood the characteristic of volts or amperes in the circuit connected to the terminals 17, 19 is that shown in Fig. 4 in which the current is unidirectional but varies periodically and in a cycle corresponding to the cycle of the A. C. supply.

In the circuit connected to the terminals 17, 19 a load device, such as the battery 21, is connected in series with the terminals 17, 19 and in series with the current coil 23 of a solenoid. The magnetic induction or flux of the solenoid coil 23 is that which is produced by the changing current flowing through the battery 21 and such magnetic induction or flux is determined by the number of turns of the solenoid coil 23 and the amount of current flowing therethrough and through the battery 21 at any given instant. It will be understood that the measurable amount of such current is the mean determined in the conventional manner for a periodically varying current and as diagrammatically illustrated in Fig. 4.

In a broad concept of the invention the magnetic flux produced by the current flowing through the coil 23 is utilized for controlling the magnetic induction of the inductance coil 5. In the particular embodiment being described in connection with Fig. 1 in which a storage battery 21 is connected to the rectifier for supplying a charging current to the battery, the amount of the charging current flowing through the coil 23 gradually decreases in the customary manner, as shown in Fig. 3. The curve of charging current shown in Fig. 3 as applied to the embodiment of Fig. 1 is intended to represent the usual mean of the periodic values of the unidirectional current supplied by the rectifier, as represented in Fig. 4. The magnetic induction and the flux produced by the coil 23, therefore, will fluctuate in accordance with the cyclic variation of the unidirectional current, although with inductive lag with respect thereto. The flux produced by the mean current will be greatest at the beginning of the charge when the counter electro-motive force or voltage across the battery is relatively low and will gradually reduce as the voltage of the battery increases due to the charging. The periodic or cyclic variation, of course, continues with same period throughout the reduction of the mean value of the charging current.

After such decrease of the charging current and corresponding increase of the voltage across the battery has progressed to a certain degree, as is well known, "gassing" of the battery starts and increases as the charge in the battery increases. Because of the production of heat which may cause warping of the plates and the deposition of solid salts which may cause short circuiting and other difficulties, it has been recognized as desirable to change the charging rate, that is the amount of current flowing through the battery, at a suitable point in the range of reduction of the current flowing and of corresponding increase of the voltage across the battery, in order to limit the amount of gassing and of undesirable deposits. For the purposes of explanation in connection with the present invention this point of the change of the current which is effected by changing the voltage applied to the unidirectional or direct current circuit at the terminals 17, 19 in the embodiment of Fig. 1 is termed the "trigger point."

In order to effect change at the "trigger point" of the current flowing in the unidirectional circuit in series through the battery 21 and the solenoid coil 23, the magnetic core 7 is moved into the inductance coil 5 to reduce the current supplied to the primary 1 of the transformer and the voltage supplied by the secondary 3 of the transformer and correspondingly the voltage at the terminals 17, 19, of the rectifier above mentioned. Such movement of the core 7 is accomplished in response to change in the magnetic induction and flux in the space within the solenoid 23 by means of a mechanical connection in the particular embodiment of Fig. 1 between a core 25 movable into and out of a position of greater magnetic induction with respect to the solenoid coil 23 and the core 7 of the inductance coil 5. Thus, as shown in Fig. 1, the core 25 being disposed within the coil 23 and in the position of greater magnetic induction, the core 7 connected to core 25 by the link 27 and the lever 29 pivotally supported at 31 and by link 33 is held out of the position of greater magnetic induction of the inductance coil 5. This position and relation of the parts prevails as long as the pull of the coil 23 on the core 25 is sufficient to over-balance the pull of the inductance coil 5 on the core 7. When, however, the current in the coil 23 and the corresponding flux concentrated in the magnetic core 25 are reduced to a predetermined point the relatively unconcentrated lines of magnetic force which pass through the lower end of the core 7 of Fig. 1 are then able to produce sufficient pull upon the core 7 to move this core into the cylindrical space within the inductance coil 5, against any residual pull of the solenoid 23 on the core 25. It is found that such movement takes place abruptly and with great rapidity, especially when, as hereinafter described, the flux within the solenoid coil 23 is the resultant of the fluxes of the windings of a differential solenoid of which the current carrying winding is the coil 23. The rapid movement of the core 7 into the position of greater magnetic induction in the inductance coil 5 is due to the progressively increasing concentration of the lines of magnetic force or flux in the core 7 as the core moves toward the position of greater magnetic induction within the coil 5. Correspondingly the concentration of the lines of magnetic force or flux in the core 25 progressively reduces as this core is moved out of the position of greater magnetic induction with respect to the solenoid 23. The initial imbalance developed at the predetermined point of reduced current, therefore, becomes sharply increased and abrupt and rapid movement occurs.

In order more sharply to determine the "trigger point" in accordance with the invention a differential solenoid is utilized producing the flux acting on the core 25. Such a differential solenoid is represented as to its current carrying coil by the coil 23 in Fig. 1 tending to function as above described. The winding 35 of Fig. 1 is concentric with the coil 23 and is wound with respect to the direction of winding of the coil 23 and is so connected with respect to the direction of a unidirectional potential of the circuit connected to the rectifying terminals 17, 19 that the flux of the winding 35 opposes the flux of the coil 23. The terminals of the winding 35 may be connected across a potential difference in this unidirectional circuit which varies with variation in the current flowing through the circuit. In a circuit having a load device such as a storage battery, preferably the winding 35 is connected across the terminals of the battery and so that, as above stated, the flux produced by the winding 35 is opposed to that of the coil 23, as shown in Fig. 1.

Since, as shown in Fig. 3, in the charging of a storage battery the volts across the battery increase as the charge proceeds, the potential applied to the coil 35 gradually increases, the current flowing through the coil 23 correspondingly decreasing as shown in Fig. 3 and as above referred to. It will be apparent that a sharply demarked point of intersection of these two curves of volts and amperes is represented in the diagram of Fig. 3, and that at this point fluxes produced respectively by the coils 23 and 35 are determined. The ampere turns of the two coils may be such that the opposing fluxes substantially neutralize each other at the point of intersection of the curves of volts and amperes as represented in Fig. 3. Broadly, however, the flux of the potential winding 35 of the differential solenoid which will substantially neutralize the flux due to the current flowing through the current coil 23 and corresponding to a given condition as to gassing and other conditions of the battery may be determined for a potential of the curve of volts across the battery other than that at the intersection as shown in Fig. 3. In any case it will be understood that the flux acting upon the core 25 is reduced during charging not only because of the reduction of the current flowing through the coil 23 but also because of the increase of the opposing flux due to the increase of the current flowing through the winding 35 corresponding to the increase of the potential across the battery. This provides a condition which is highly sensitive and the substantial neutralization of one flux by the other makes it possible for the inductance coil 5 to produce the abrupt movement of the core 7 into the position of greater inductance when the condition of substantial neutralization is reached. It will be clear, therefore, that a corresponding abrupt increase in the inductance of the alternating current circuit in which the inductance coil 5 is connected in series with the primary of the transformer is produced and a corresponding reduction of the potential across the terminals 17, 19 and an abrupt reduction of the charging current flowing through the battery. Because of the increased magnetic inductive action of the coil 5 on the core 7 and the corresponding decrease of the magnetic induction on the core 25 the relation of the parts remains the same after the "trigger point," the lever 29 being in the dotted position of Fig. 1, as the charging current continues to decrease and the potential of the battery continues to rise with concomitant increase of the flux of winding 35 now predominating over the flux of coil 23.

It will be understood that by suitable design as to number of turns of the windings of the inductance coil and the differential solenoid, the cross-section and weight as well as the axial disposition of the cores and other design factors, the "trigger point" may be determined before or after substantial neutralization of the solenoid fluxes occurs.

While the features of the invention have been described in connection with a specific embodiment in the charging of a storage battery, in its broad concept the invention may be utilized for delivering a unidirectional current to a load device which has a characteristic of progressively changing the amount of current flowing therethrough.

In Fig. 2 is shown the application of the invention to an apparatus for charging a storage battery utilizing a rectifier 40 connected to the secondary windings of a three phase transformer 42, this transformer being supplied from a three phase alternating current supply 43 controlled by switch 44. The primary windings 45 of the transformer 42 are connected in star or Y connection. In each phase of the supply circuit, that is in each of the leads connecting from the terminals of the switch 44 to the primaries of the transformer the respective windings 47 of a three phase inductance are connected in series respectively with the windings 45 of the transformer. The windings 47 are provided with cores 49 respectively movable into and out of the coils 47 for increasing and decreasing the magnetic induction thereof, thereby to decrease and increase the current flowing through the primary windings 45 of the transformer.

As shown in Fig. 2 the cores 49 are connected by a yoke piece 51 for movement of all three cores together into and out of the coils 47. This yoke piece is connected by link 53 to the core 25 of a differential solenoid having current coil 23 and potential winding 35 which are connected in the unidirectional circuit and function in the same manner as described in connection with Fig. 1. The current coil 23 is connected through the switch 55 in series with the battery 21 and ammeter A across the terminals 57, 59 of the three phase rectifier 40 so that the charging current flowing through the battery 21 flows through the coil 23 and produces a flux to which the core 25 is responsive. The winding 35 is connected across the terminals of the battery when the switch 55 is closed for charging. In the embodiment of Fig. 2 the core 25 is biased by spring 61 upwardly. The arrangement of the parts is such that the core 25 is disposed in a position of greater magnetic induction with respect to the solenoid coil 23, and the cores 49 are held out of the position of greater magnetic induction with respect to the inductance cores 47, these being the positions of the parts before "trigger point."

As the current flowing in the circuit connected to the terminals 57, 59 of the rectifier 40 decreases in the charging of the battery 21, "trigger point" is reached, as described in connection with Fig. 1, and the cores 49 are abruptly moved to a position of greater magnetic induction in the coils 47 against the bias of the spring 61 when the magnetic flux in the differential solenoid 23, 35 has been reduced sufficiently for the pull of the coils 47 to effect such movement in the manner described in connection with Fig. 1. It will be apparent that in such movement the core 25 is moved downwardly out of position of greater magnetic induction with respect to the coils 23, 35 and against the bias of the spring 61. Such movement of the cores 49 into coils 47 increases the inductance in each phase of the primary circuit with corresponding decrease of the potential supplied by the secondary windings 46 of the transformer 42. These secondary windings in the embodiment shown in Fig. 2 are connected in delta, the common points of connection being connected to the unidirectional elements of the rectifier 40 in the conventional manner, as shown in Fig. 2. The potential developed across the unidirectional terminals 57, 59 of the rectifier thereby is reduced and the charging current flowing through the battery is correspondingly reduced.

It will be apparent in connection with the embodiment of Fig. 2 that the "trigger point" may be determined by the intersection of the curve of charging current and the curve of potential across the battery, as shown in Fig. 3 and described in connection with Fig. 1. In the embodiment of Fig. 2, however, which utilizes a three phase supply and a three phase rectifier the characteristic curve of the undulating unidirectional potential difference and of undulating unidirectional current is shown in Fig. 5. The current flowing through the circuit which connects the coil 23 and the battery in series to the rectifier is not a constant direct current but one which is composed of part waves, six of such part waves being produced by such a three phase rectifier. The effective charging current flowing through the battery is the usual mean of these waves measured above zero and one cycle of the applied alternating current supply corresponds to six of these part waves.

While the characteristic curves of Figs. 3, 4 and 5 are well known and are produced by conventional apparatus, the undulating character of the potential and current produced by such rectifiers, whether single phase or three phase, is found to be of particular advantage in connection with the invention. While in the coil 5 and each coil 47 the usual sinusoidal type of alternation in each cycle occurs when the supply is a conventional periodic alternating current supply, the effect of the undulating unidirectional current upon the core 25 of the solenoid and particularly the core of the differential solenoid has not been utilized heretofore to secure more precise determination of the "trigger point." Having regard to the provision of means operatively connecting the solenoid 23, specifically the differential solenoid 23, 35 with the inductance coil 5, 47, this undulating current develops an undulating flux and secures more precisely at the required point of current reduction the abrupt movement of the core 7, 49 into the inductance coil to decrease the voltage applied to the rectifier and, therefore, to decrease the current flowing through the battery. It has been found further that a solenoid developing only a small fraction of the force necessary with constant direct current is required to move the cores with the desired abrupt movement and without drag or sticking when the solenoid, and particularly a differential solenoid, is connected in the circuit in which such an undulating although unidirectional current flows. In the utilization of conventional periodic alternating current supplies, such as the conventional single phase or three phase supplies, the unidirectional current in the battery charging circuit will be periodic and the customary uniformity of this periodic unidirectional current affords conditions which contribute to the precise determination of the "trigger point."

Indicative of the conditions of charging a storage battery with the control system of the invention are the data given in the following table with respect to a set of twelve cells supplied from a three phase rectifier as described in connection with Fig. 2:

|  | Spec. Grav. | Volts Per Cell | Charging Current, D. C. Amp. | Current Per Phase, A. C. Amp. |
|---|---|---|---|---|
| Alpha | 1,140 | 1.75 | 50 | 10 |
| Pre-Trigger | 1,260 | 2.35 | 28 | 3.5 |
| Post-Trigger | 1,260 | 2.25 | 14 | 1.75 |
| Omega | 1,280 | 2.50 | 10 | 1.0 |

The items identified as "alpha" and "omega" show the conditions at the beginning and end of the charge. The item identified as "pre-trigger" shows the conditions just before the cores 49 are drawn into the inductance coils 47. Immediately after the cores 49 reach the position of higher magnetic induction in respect to the coils 47 the "post-trigger" conditions obtain.

The volts per cell represent the potential taken across the battery divided by the number of cells. It will be noted that this potential increases from "alpha" to 2.35 volts at "pre-trigger" and then is reduced at "post-trigger" at 2.25. This voltage again increases to 2.50 at the end of the charge. The charging current which at the beginning of the charge is 50 amperes is reduced to 28 amperes at "pre-trigger." This current by the operation of the control device of the invention is sharply reduced to 14 amperes at "post-trigger" and further is reduced to 10 amperes at the end of the charge. To accomplish this change in the direct current amperes the current supplied to the primary windings 45 of the transformer and flowing through the respective inductance coils 47 is 10 amperes at the beginning of the charge and falls to 3.5 amperes at "pre-trigger" because of the normal effect of the rising counter voltage of the battery concomitantly with the reduction of the charging current. When the inductance in the alternating current circuit to the transformer is abruptly increased by the operation of the control system of the invention the current becomes reduced at "post-trigger" to 1.75 and thereafter gradually reduces to 1 ampere at the end of the charge.

As above mentioned in connection with Fig. 1, although a substantial current continues to flow through the coil 23 as the operation continues to the end of the charge and the current flowing through the inductance coils 47 has been greatly reduced, the movable parts remain in the "post-trigger" position because the flux produced by the coils 47 is highly effective upon the cores 49 now disposed within these coils and the resultant of the flux produced by the coil 23 and the opposed flux produced by the winding 35, which resultant now increases with the battery voltage, is relatively of considerably less effect because the core 25 is in a position out of the coils 23, 35, that is, out of the position of greater magnetic induction. It will be apparent, therefore, that the apparatus of the invention operates to produce the desired change in the charging current at a precisely determined point, the "trigger point," or at a predetermined amount of this current, the required conditions for continued charging after such operation of the device being maintained so as to complete the charge. Upon again starting the charging of a battery the cores may be reset to the initial position as shown in Figs. 1 and 2.

It will be apparent further that in effecting the requisite changes in the current supplied by the source, specifically an alternating current supply connected to a rectifier, no switching devices or relays are used. The respective fluxes produced by the inductance coils 5, 47 and the differential solenoid 23, 35 are very precisely determined by the number of turns of each of the windings of these coils and by the amperes of current, alternating or direct current, flowing therethrough. No variation of these conditions occurs due to imperfect contacts, sticking of relay armatures, wear, friction or other disturbing factors as may occur with conventional control systems. The relatively few mechanical and movable parts in the apparatus of the invention make possible the provision of a simple, relatively low cost device which may be manufactured easily for carrying out the purposes of the invention, and may be used with conventional rectifying and direct current producing systems and requires little time and attention for insuring its proper operation.

Although the invention has been disclosed in connection with a transformer and a rectifier, specifically a bridge type rectifier, within the scope of the invention other suitable conventional means utilizing an alternating current supply and delivering a direct current to the terminals of the load device or the battery may be substituted for the transformer and rectifier. The action of the solenoid 23, 35 and of the inductance coil 5 will remain the same as described above.

I claim:

1. In a battery charging system, means connected to a source of periodically varying potential difference and providing a supply of unidirectional potential difference, a solenoid coil connected to said means in series with said supply of unidirectional potential difference and carrying a unidirectional current in a circuit connecting a battery to be charged in series with said solenoid coil and in series with said unidirectional supply, an inductance coil connected to said source of periodically varying potential difference in a circuit connecting said means in series with said inductance coil, and means operatively connected to said coils and operable to increase and decrease the magnetic induction of said inductance coil in response respectively to decrease and increase of the magnetic induction of said solenoid coil.

2. In a battery charging system, means connected in series with a source of alternating current and providing a supply of unidirectional potential difference, a solenoid coil connected to said means in series with said supply of unidirectional potential difference and carrying a unidirectional current in a circuit connecting a battery to be charged in series with said solenoid coil and in series with said unidirectional supply, an inductance coil connected in series with said source of alternating current for flow of alternating current through said means and through said inductance coil in series, and means operatively connected to said coils and operable to increase and decrease the magnetic induction of said inductance coil in response respectively to decrease and increase of the magnetic induction of said solenoid coil.

3. In a battery charging system as defined in claim 2, a winding connected across a potential difference of said unidirectional current circuit varying with variation in the potential of said battery and disposed in relation to said solenoid coil so as to develop magnetic induction with the lines of magnetic flux of said winding generally coincident with the lines of magnetic flux of said solenoid coil and with said fluxes opposed to each other, said operative connection between said coils providing for said increase and decrease of the magnetic induction of said inductance coil in response to the resultant magnetic induction of said solenoid coil and said winding.

4. In a battery charging system, means connected to a source of periodically varying potential difference and providing a supply of unidirectional potential difference, a solenoid coil having a magnetic core movable into and out of magnetic inductive relation to said coil with corresponding variation of the magnetic flux of said solenoid, said solenoid coil being connected to said means in series with said supply of unidirectional potential difference and carrying a unidirectional current in a circuit connecting a battery to be charged in series with said solenoid coil and in series with unidirectional supply, an inductance coil connected to said source of periodically varying potential difference in a circuit connecting said means in series with said inductance coil, said inductance coil being provided with a magnetic core movable into and out of magnetic inductive relation to said inductance coil with corresponding variation of the magnetic flux of said inductance coil, and means operatively connecting said core of said solenoid with said core of said inductance coil concomitantly to move said cores to increase and decrease the magnetic flux of said inductance coil respectively upon decrease and increase of the magnetic flux of said solenoid coil.

5. In a battery charging system as defined in claim 4, said operative connecting means comprising a mechanical connection between said cores providing for movement of each core into and out of a position of greater magnetic induction concomitantly with movement of the other core respectively out of and into a position of greater magnetic induction.

6. In a battery charging system, a source of alternating current, an inductance coil, a transformer having a winding connected in series with said inductance coil, said series connected inductance coil and transformer winding being connected to said source of alternating current for flow of alternating current in series through said inductance coil and transformer, a rectifier having two alternating current terminals connected to said transformer for flow of alternating current between said transformer and said rectifier, said rectifier having two other terminals providing a source of unidirectional potential difference, a solenoid coil connected in series with a battery to be charged, said solenoid and said battery connected in series therewith being connected in series with said unidirectional potential difference terminals for flow of a unidirectional current in series through said battery and through said solenoid coil, and means operatively connecting said solenoid coil to said inductance coil and operable to increase and decrease the magnetic induction of said inductance coil concomitantly respectively with decrease and increase of the magnetic induction of said solenoid coil.

7. In a battery charging system, a source of alternating potential difference, a rectifier connected in a circuit connected to said source to receive alternating current therefrom and delivering a supply of undulating unidirectional potential difference, a solenoid coil connected in series with said rectifier in a circuit carrying an undulating unidirectional current and connecting a battery to be charged in series with said solenoid coil and in series with said supply of undulating unidirectional potential difference, a winding connected across a potential difference of said unidirectional circuit progressively varying with progressive change in the amount of said undulating unidirectional current, said winding being disposed in relation to said solenoid coil so as to develop lines of magnetic flux generally coincident with the lines of magnetic flux of said solenoid coil, said magnetic fluxes being opposed to each other, and current control means connected in said alternating current circuit to control said alternating current and operatively connected to said solenoid and said winding and operable to change the amount of said alternating current concomitantly with a predetermined variation of the resultant magnetic flux of said solenoid coil and said winding.

References Cited in the file of this patent

UNITED STATES PATENTS

| Number | Name | Date |
|---|---|---|
| 397,616 | Thomson | Feb. 12, 1889 |
| 674,942 | Sprong | May 28, 1901 |
| 877,258 | Thomas | Jan. 21, 1908 |
| 1,255,535 | Jepson | Feb. 5, 1918 |
| 2,066,509 | Young | Jan. 5, 1937 |
| 2,187,523 | Pelikan | Jan. 16, 1940 |
| 2,306,998 | Claesson | Dec. 29, 1942 |
| 2,474,761 | Spoor | June 28, 1949 |

FOREIGN PATENTS

| Number | Country | Date |
|---|---|---|
| 635,285 | Germany | Sept. 14, 1936 |